United States Patent [19]  [11]  4,133,932
Peck  [45]  Jan. 9, 1979

[54] SOUND DEADENER SHEET
[75] Inventor: Sumner H. Peck, Wakefield, Mass.
[73] Assignee: USM Corporation, Farmington, Conn.
[21] Appl. No.: 853,844
[22] Filed: Nov. 22, 1977

Related U.S. Application Data
[63] Continuation of Ser. No. 748,201, Dec. 7, 1976, abandoned, which is a continuation-in-part of Ser. No. 697,575, Jun. 18, 1976, abandoned.

[51] Int. Cl.² .............................................. B32B 5/16; G10K 11/00
[52] U.S. Cl. .................................. 428/323; 181/294; 252/62; 260/28.5 A; 260/28.5 AV; 428/161; 428/164; 428/165; 428/324; 428/330; 428/489
[58] Field of Search .................. 252/62; 260/28.5 A, 260/28.5 AV; 428/143, 147, 150, 323, 327, 330, 331, 344, 346, 347, 348, 349, 402, 403, 407, 484, 480, 489, 161, 164, 165, 324; 181/294

[56] References Cited
U.S. PATENT DOCUMENTS

| 2,733,159 | 1/1956 | Scoggin et al. ......................... 252/62 |
| 3,249,567 | 5/1966 | Vigneault ..................... 260/28.5 AV |
| 3,336,252 | 8/1967 | Raichle et al. ............... 260/28.5 AV |
| 3,846,362 | 11/1974 | Reinecke et al. ............ 260/28.5 AV |
| 4,000,140 | 12/1976 | Tierney ........................... 260/28.5 A |
| 4,026,854 | 5/1977 | Buechner et al. ............ 260/28.5 AS |

FOREIGN PATENT DOCUMENTS

| 405091 | 3/1966 | Australia ..................................... 252/62 |
| 532453 | 10/1956 | Canada ...................................... 252/62 |
| 453843 | 9/1936 | United Kingdom. |
| 986632 | 1/1961 | United Kingdom ....................... 252/62 |
| 1047118 | 11/1966 | United Kingdom ....................... 252/62 |

OTHER PUBLICATIONS
American Cyanamid, "Factice", Jul. 1973.

Primary Examiner—George F. Lesmes
Assistant Examiner—B. Hess
Attorney, Agent, or Firm—Benjamin C. Pollard; Richard B. Megley; Vincent A. White

[57] ABSTRACT

A sound deadener sheet softenable by heat to wilt into conformity and adhesive engagement with a contoured metal surface but resistant to running and flow at higher temperatures comprising a mineral-filled bitumen containing a small amount of vulcanized vegetable oil.

9 Claims, 1 Drawing Figure

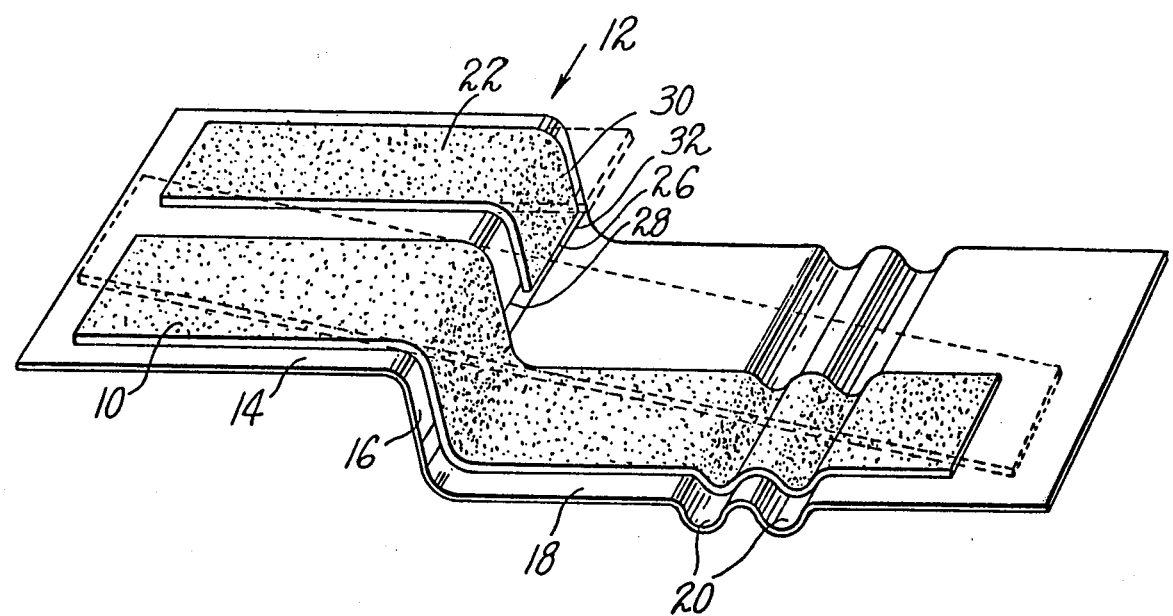

SOUND DEADENER SHEET

BACKGROUND OF THE INVENTION

This is a continuation, of application Ser. No. 748,201, filed Dec. 7, 1976, which is a continuation-in-part of Ser. No. 697,575, filed June 18, 1976, both now abandoned.

FIELD OF THE INVENTION

This invention relates to an improved sound deadening material.

Damping of vibration in thin sheet material such as the sheet metal floor pans of automobiles is important to reduce noise level. Presently, vibration damping of metal floor pans is secured by adhering a composition sheet to the metal by placing the composition sheet on the metal floor pan before the automobile body goes through heating ovens employed in finishing the body. The heat of the oven softens the composition sheet so that it wilts into conformity with the floor pan and adheres to the metal surface. A variety of heat softenable compositions, usually mixtures of bitumen, fillers and/or fibers, and a natural or synthetic hydrocarbon rubber, e.g., a butadiene styrene copolymer synthetic rubber, have been tried for this use.

Tests established for acceptance of materials for this use by automobile manufacturers require that the sheet material wilt into conformity with and adhere to the metal of the floor pans at temperatures at least as low as temperatures reached in the heating ovens during finishing of the body, but that flowing or running of the material at substantially higher temperatures shall not exceed a limited value. These tests can be met by using substantial proportions of a hydrocarbon rubber in the composition. However, use of such proportions or rubber, which is much more expensive than bitumen, markedly increases the cost of the sheet material and is believed to reduce the vibration damping efficiency.

BRIEF SUMMARY OF THE INVENTION

It is an object of the present invention to provide a less expensive sound deadening sheet material capable of meeting the temperature response requirements for use in automobiles.

To this end, and in accordance with a feature of the present invention, there is provided a sheet composition based on bitumen and filler in which resistance to undesired high temperature flow together with good conformability and adhesion properties are secured through combination and interaction of a limited amount of a vulcanized vegetable oil with the bitumen.

DRAWING

The FIGURE is an angular elevational view of a contoured metal sheet used for testing thermal properties of sound deadener sheet material.

DETAILED DESCRIPTION

In accordance with the present invention, I have provided a filled bituminous sound deadener sheet having an unexpected combination of characteristics in heated condition particularly fitting it for union with shaped metal, such as in use of the sheet material as a sound deadener for automobile floor pans. These unexpected properties are secured through combination of relatively small proportions of a vulcanized vegetable oil with bitumen as binder for mineral filler. The binder preferably also includes an elastomeric modifier to reduce brittleness and improve elasticity and resistance to tearing.

Vulcanized vegetable oil is a solid, non-thermoplastic product of reacting vegetable unsaturated oil such as linseed oil, cottonseed oil, soybean oil or others with sulfur or with sulfur derivatives such as sulfur monochloride, sulfur dichloride, and the like. These materials are commercially available for example under the trademark "FACTICE" from the American Cyanamid Company. The product from reaction of the vegetable oil with sulfur is preferred for the present use. These vulcanized oils are most commonly used as extenders, processing aids or plasticizers for natural and synthetic rubbers. However, in the present case, the vulcanized oil coacts with the bitumen to provide, in the mineral-filled bitumen sound deadener sheet of the present invention, a unique combination of good heat wilting characteristics for conforming and bonding to a ribbed and/or curved metal plate, and of resistance to running or flow at high temperatures.

The bitumens which can be employed in the binder for compositions of the present invention are preferably asphaltic and may be either natural asphalt or residue from the distillation of petroleum. The asphaltic bitumens are commercially available in penetration values up to about 300 as determined by ASTM method D-5-73 at 77° F. Softening points (Ball and Ring), as determined by ASTM method D-36-70 should be in the range of from about 60° F. to about 110° F., preferably from about 60° F. to about 80° F.

Hydrocarbon oil is preferably included in relatively small percentages as a component of the binder to improve mixing of the bitumen with the mineral filler. Also, it has been found that addition of gilsonite to the composition materially improves the breaking strength and tear strength of the sound deadener sheet.

Elastomeric modifiers for inclusion in the compositions of the present invention may be hydrocarbon elastomers and copolymers of ethylene with non-hydrocarbon monomers which may be known for inclusion in bituminous compositions.

Hydrocarbon rubber-like elastomers useful as modifiers for combination with bitumen and vulcanized vegetable oil in the binder for the sound deadening composition may be natural rubber, synthetic polymer or copolymer rubbers or reclaim rubber. Suitable synthetic rubbers include styrene-butadiene copolymer synthetic rubbers, butadiene-styrene block copolymers, e.g. "Kraton" 1107 manufactured by the Shell Chemical Co., butyl rubber, polyisobutylene, ethylenepropylene copolymers (EPM), ethylene-propylene-diene terpolymers (EPDM) and mixtures of these. A preferred range of Mooney values is from 20 to 35.

Preferred ethylene copolymers for use as elastomeric modifiers include bitumen-soluble copolymers containing from about 40% to about 98% preferably from about 60% to about 90% by weight of ethylene with from about 60% to about 2% preferably from about 40% to about 10% by weight of a mono-unsaturated polymerizable compound such as a lower alkyl, i. e. 1 to 6 carbon atoms, acrylate or methacrylate.

Gilsonite which also forms a component of the binder is a natural hard thermoplastic hydrocarbon resin having a melting point of from 270° C. to 260° C. and a penetration at 77° F. of less than 1.

A preferred formulation offering special advantages in the binder of the present sound deadener, involves combining in balanced ranges of proportions, bitumen, elastomer modifier and gilsonite together with a small but effective amount of vulcanized vegetable oil to control the softening and flow properties together with good sound deadening efficiency and low cost. Based on the total weight of the binder, useful proportions in terms of weight percentages will include from 45% to 70%, preferably about 50% to 60% by weight of bitumen, from about 50% to about 20%, preferably from about 10% to about 15% of elastomeric modifier, from about 15% to about 20% of gilsonite, and from about 1.5% to about 3.5%, preferably from about 2% to about 2.5% of vulcanized vegetable oil.

Mineral filler for combination with the binder may be any of a variety of finely divided inorganic materials such as ground limestone, suitably a dolomitic limestone, whiting, barytes, calcium carbonate, clay, slate, mica and so on.

The particle size should be such that about 80% will pass a 200 mesh screen and none will be held on a 35 mesh screen.

The filler content of the sound deadener sheet of the present invention may be between about 60% to about 85% preferably from about 75% to about 85% by weight and the binder correspondingly from about 40% to about 65% preferably from about 25% to about 15% by weight based on the weight of the sheet.

The sheet may be compounded in any conventional manner as by mixing together the bitumen, elastomeric modifier, gilsonite and vulcanized vegetable oil in a heated vessel and then adding the mineral filler to the hot mixture and mixing to uniformity. The mixture is then formed into a sheet by calendar rolls or other suitable device. For use as a sound deadener for sheet metal floor pans for automobiles, sheets are preferably from about 0.05 inch to about 0.1 inch in thickness.

The sound deadener sheet for use with an automobile floor pan is merely laid on the upper surface of the floor pan and is required to soften and wilt into conformity with the contour of the floor pan during the heating used in finishing the automobile body, but must also not be softened to a condition in which it runs excessively so as to lose its uniformity and to run or flow past the areas where it is desired. Tests for acceptance of sound deadener sheet material involve laying a 2 × 10" strip 10 of the sound deadener sheet across a metal sheet 12 contoured as shown in the FIGURE and heating the assembly to 275° F. for one-half hour. As shown in the FIGURE, the metal sheet 12 has a flat, horizontally disposed first section 14, a section 16 extending downward at right angles to the first section and a further horizontally disposed section 18. The section 18 is formed with small grooves 20. It is required that after the heating, the strip 10 has sagged or wilted from its original position and flat shape shown in broken lines in the FIGURE into conformity not only with the downwardly angled section 16 but also with the small grooves 20 so that there is not more than a 1/16" gap between the strip 10 and the contoured metal section 12 at any point. A further test to establish that the sheet does not flow or run excessively involves disposing a 2 × 6" strip 22 on the flat portion 15 of the contoured metal surface with a portion of the strip, as shown in broken lines in the FIGURE, extending beyond the edge that flat portion 14 by an amount which would bring the edge 26 against an upper score mark 28, on downwardly extending portion 30 when the strip 22 has bent downwardly into engagement with the vertical portion 16 of the metal sheet 12. It is required that on heating the sample to 400° F. the downwardly bent portion 30 of the strip 22 must not flow more than ⅜" in one hour, i.e. must not have flowed down to the lower score mark 32 on the vertical portion 16 of the metal surface. Additional requirements are that the sheet have a breaking tensile strength of at least 0.1 pound per mil thickness and inch width.

The following examples are given to aid in understanding the invention but it is to be understood that the invention is not restricted to the particular procedures, materials or the like of the examples.

EXAMPLE ONE

The following is a formula of a sound deadener sheet for use in connection with an automobile floor pan.

| | |
|---|---|
| Finely divided dolomitic limestone | 80 |
| CaO | 0.6 |
| Butadiene styrene copolymer rubber (Mooney viscosity 27 to 35) | 3.2 |
| Gilsonite | 4.5 |
| Low melting point bitumen | 11.2 |
| Vulcanized vegetable oil (Factice #11 Brown) | 0.5 |

The bitumen was a commercial product known as 22 L, obtained from Pioneer Division of Witco Chemicals Co. having a Ball and Ring melting point of about 80° F. and a nominal penetration value of 300 at 77° F. by ASTM method of D-5-73. The finely divided dolomitic limestone had a particle size such that about 80% will pass a 200 mesh screen and none will be retained on a 35 mesh screen, the screens being U.S. Standard Sieve.

The butadiene styrene copolymer rubber, gilsonite and vulcanized vegetable oil were introduced into an internal mixer sold under the trademark BANBURY and worked together at 320° F. At this point, ½ of the bitumen and ½ of the finely divided dolomitic limestone were added and when they had been thoroughly mixed in, the remainder of the components were added and thoroughly mixed in. The mixture was discharged from the mixer and sheeted out between the rolls of a calendar to a thickness of 0.070" ± 0.005".

The sheet material was subjected to the conformity and flow tests described above in the specification and successfully passed these tests.

A composition identical with the formula given above except that it did not include vulcanized vegetable oil was prepared and formed into a sheet. When the sheet was subjected to conformity and flow tests, it was found that the material flowed badly during the 400° F. portion of the test.

EXAMPLE TWO

The following formula was prepared for use as a sound deadener sheet for an automobile floor pan.

| | Parts by weight |
|---|---|
| Finely divided dolomitic limestone | 79.7 |
| CaO | 0.6 |
| Ethylene propylene diene terpolymer (EPDM) | 1.0 |
| Gilsonite | 3.0 |
| Intermediate melting point bitumen | 15.2 |
| Vulcanized vegetable oil | 0.5 |

The composition was mixed and formed into a sheet following the procedure of Example One. The resulting sheet material was subjected to the conformity and flow tests described above in the specification and successfully passed these tests.

EXAMPLE THREE

The following formula was prepared for use as a sound deadener sheet material.

|  | Parts by weight |
| --- | --- |
| Finely divided dolomitic limestone (200 mesh) | 80.5 |
| CaO | 0.6 |
| Ethylene-propylene copolymer | 3.2 |
| Vulcanized vegetable oil | 0.5 |
| Low melting point bitumen | 11.2 |
| Gilsonite | 4.0 |

The ethylene-propylene copolymer was the commercial product known as Vistalon 404, a product of Enjay Chemical Company having an ethylene content of about 40%, a propylene content of about 60% and a Mooney value of 35 to 45 and the bitumen was the same bitumen material used in Example One.

The composition was mixed and formed into a sheet following the procedure of Example One. The resulting sheet was subjected to the conformity and flow tests described above in the specification and successfully passed these tests.

Having thus described my invention, what I claim as new and desire to secure by Letters Patent of the United States is:

1. A sound deadener sheet softenable by heat to wilt into conformity and adhesive engagement with a contoured metal surface but resistant to running and flow at higher temperatures, said sheet being formed of a mixture of mineral filler and a binder, said binder comprising about 45% to about 70% by weight of asphaltic bitumen from the class consisting of natural asphalt and residue from the distillation of petroleum, from about 5% to about 20% by weight of an elastomeric modifier compatible with said asphaltic bitumen and from about 1.5% to about 3.5% of the solid, non-thermoplastic product of reaction of vegetable unsaturated oil with sulfur, sulfur monochloride or sulfur dichloride coacting with the asphaltic bitumen to prevent running and flow of said sheet at higher temperatures, said weight percentages being based on the weight of said binder.

2. A sound deadener sheet as defined in claim 1 in which said mixture comprises from about 60% to about 85% by weight of mineral filler and from about 40% to about 15% by weight of said binder.

3. A sound deadener sheet as defined in claim 2 in which the elastomeric modifier is a hydrocarbon elastomer.

4. A sound deadener sheet as defined in claim 3 in which said elastomeric modifier is a copolymer of ethylene and propylene.

5. A sound deadener sheet as defined in claim 3 in which said elastomeric modifier is a terpolymer of ethylene, propylene and a diene.

6. A sound deadener sheet as defined in claim 3 in which said elastomeric modifier is a butadiene styrene copolymer rubber.

7. A sound deadener sheet as defined in claim 2 in which said elastomeric modifier is a copolymer of ethylene and a lower alkyl ester of acrylic or methacrylic acid in which the ethylene is at least about 50% of said copolymer.

8. A sound deadener sheet as defined in claim 2 in which said binder comprises from about 15% to about 25% by weight of gilsonite and in which said bitumen has a softening point (Ball and Ring) of from about 60° F. to about 110° F.

9. A sound deadener sheet as defined in claim 8 in which said mixture comprises from about 75% to about 85% by weight of mineral filler, the particles of mineral filler being of a size less than that which will pass a 325 mesh screen and from about 25% to about 15% by weight of a binder and, said binder comprising from about 50% to about 60% by weight of bitumen having a softening point between about 60° F. and about 80° F., from about 10% to about 15% by weight of an elastomeric modifier, from about 15% to about 25% by weight of gilsonite, and from about 2% by weight of a vulcanized vegetable oil.

* * * * *